United States Patent
Tamura (10) Patent No.: US 7,804,810 B2
(45) Date of Patent: Sep. 28, 2010

(54) CIRCUIT, METHOD, AND PROGRAM IN A CDMA COMMUNICATION SYSTEM FOR QUICKLY TRACKING A STABLE PATH

(75) Inventor: Koichi Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 1826 days.

(21) Appl. No.: 10/765,124

(22) Filed: Jan. 28, 2004

(65) Prior Publication Data

US 2004/0184411 A1    Sep. 23, 2004

(30) Foreign Application Priority Data

Jan. 29, 2003    (JP)    ............... 2003-019604

(51) Int. Cl.
 H04W 4/00    (2009.01)
 H04L 12/50    (2006.01)
(52) U.S. Cl. ..................... 370/341; 370/357
(58) Field of Classification Search ........... 370/335, 370/252, 351, 357; 375/267, 347, 299; 455/132, 455/101

See application file for complete search history.

(56) References Cited

U.S. PATENT DOCUMENTS

| | | | | |
|---|---|---|---|---|
| 6,026,115 | A * | 2/2000 | Higashi et al. | ............... 375/148 |
| 6,157,687 | A * | 12/2000 | Ono | ............... 375/347 |
| 6,269,239 | B1 * | 7/2001 | Hashem et al. | ............... 455/69 |
| 6,356,542 | B1 * | 3/2002 | Hayata | ............... 370/342 |
| 6,493,330 | B1 * | 12/2002 | Miya et al. | ............... 370/335 |
| 6,597,678 | B1 * | 7/2003 | Kuwahara et al. | ............... 370/342 |
| 6,721,367 | B1 * | 4/2004 | Miya et al. | ............... 375/267 |
| 6,728,233 | B1 * | 4/2004 | Park et al. | ............... 370/342 |
| 6,731,711 | B1 * | 5/2004 | Jun | ............... 375/368 |
| 6,748,009 | B2 * | 6/2004 | Reznik et al. | ............... 375/147 |
| 6,795,422 | B2 | 9/2004 | Ohsuge | |
| 6,990,345 | B2 | 1/2006 | Kuwahara et al. | |
| 6,996,080 | B1 * | 2/2006 | Orr | ............... 370/335 |
| 7,031,368 | B1 * | 4/2006 | Maruta et al. | ............... 375/130 |
| 7,200,127 | B1 * | 4/2007 | Lee et al. | ............... 370/335 |
| 2001/0033609 | A1 * | 10/2001 | Tamura et al. | ............... 375/150 |

(Continued)

FOREIGN PATENT DOCUMENTS

GB    2 343 817 A    5/2000

(Continued)

*Primary Examiner*—George Eng
*Assistant Examiner*—Christopher M Brandt
(74) *Attorney, Agent, or Firm*—Foley & Lardner LLP (57) ABSTRACT

A path searching circuit is provided which is capable of searching a stable path. A power delay profile calculated by a powering section using an I component correlation value and a Q component correlation value is input to a power level change monitoring section, where a change in a power level is monitored at a sampling point for each of two or more delay profiles to be used for same power adding processing. With correct signal receiving path timing, stable high correlation values are observed, that is, it is observed that the received power level is small in change. On the other hand, with instantaneously high correlation values caused by noises, it is observed that the received power level is great in change. As a result, in the weighing coefficient controlling section, a weighing coefficient for correlation values providing a great change in a received power level is determined so that the received power level becomes low when power is added and so that weighing control is exercised.

17 Claims, 5 Drawing Sheets

U.S. PATENT DOCUMENTS

| | | |
|---|---|---|
| 2002/0024992 A1* | 2/2002 | Ogawa et al. ............... 375/148 |
| 2002/0080743 A1* | 6/2002 | Morita et al. ............... 370/335 |
| 2002/0187814 A1* | 12/2002 | Yoshida ...................... 455/562 |
| 2003/0012267 A1* | 1/2003 | Jitsukawa et al. ........... 375/148 |
| 2003/0026233 A1* | 2/2003 | Ohsuge ...................... 370/342 |
| 2003/0068993 A1* | 4/2003 | Miya ...................... 455/276.1 |
| 2003/0157892 A1* | 8/2003 | Reznik et al. ................. 455/65 |
| 2004/0013169 A1* | 1/2004 | Kanemoto et al. .......... 375/147 |
| 2004/0071193 A1* | 4/2004 | Atarashi et al. ............. 375/144 |
| 2004/0072553 A1* | 4/2004 | Wang et al. ................. 455/334 |
| 2004/0091021 A1* | 5/2004 | Arima ........................ 375/147 |
| 2004/0139466 A1* | 7/2004 | Sharma et al. ................ 725/72 |
| 2004/0213329 A1* | 10/2004 | Yano et al. .................. 375/142 |
| 2005/0271122 A1* | 12/2005 | Jonsson ...................... 375/148 |
| 2008/0043680 A1* | 2/2008 | Fitton ........................ 370/335 |

FOREIGN PATENT DOCUMENTS

| | | |
|---|---|---|
| JP | 2000-115022 A | 4/2000 |
| JP | 2000-252955 A | 9/2000 |
| JP | 2001-36430 A | 2/2001 |
| JP | 2002-232324 | 8/2002 |
| JP | 2002-232326 A | 8/2002 |
| JP | 2004-135210 A | 4/2004 |
| WO | WO 99/63677 A | 12/1999 |

\* cited by examiner

CIRCUIT, METHOD, AND PROGRAM IN A CDMA COMMUNICATION SYSTEM FOR QUICKLY TRACKING A STABLE PATH

BACKGROUND OF THE INVENTION

1. Field of the Invention

The present invention relates to a path searching circuit, a path searching method, and a path searching program and more particularly to the path searching circuit, the path searching method, and the path searching program being preferably employed in a CDMA (Code Division Multiple Access) communication system.

The present application claims priority of Japanese Patent Application No. 2003-019604 filed on Jan. 29, 2003, which is hereby incorporated by reference.

2. Description of the Related Art

In a CDMA demodulating circuit, a path diversity effect is achieved, conventionally, by path searching and rake combining. Quality of a radio wave received in a mobile telecommunication environment is degraded by a change in power levels and/or noises caused by multi-path fading. In an environment where a severe path change occurs, frequency of an error in detecting signal receiving path timing at time of searching a path becomes high, which causes degradation of a signal receiving characteristic. Therefore, advent of path searching processing is expected in which a stable path can be searched out of arriving paths and can be assigned to a finger.

A conventional path searching device is disclosed in, for example, Japanese Patent Application Laid-open No. 2001-36430, in which a judgment is made on whether or not an interpolation process to make a chip interval smaller is performed before and after each individual processing unit for every two or more processing units depending on the number of communication channels to be processed and the interpolation process is then performed, based on a result from the judgement, before and after each individual processing unit in a path searching processing steps.

However, in the above conventional technology, there is a deficiency that a path change in mobile telecommunications cannot be quickly tracked and responded, thus not enabling an excellent signal receiving characteristic.

SUMMARY OF THE INVENTION

In view of the above, it is an object of the present invention to provide a path searching circuit, a path searching method, and a path searching program, each of which is capable of searching a stable path, hereby being preferably employed in a CDMA communication system.

According to a first aspect of the present invention, there is provided a path searching circuit employed in a CDMA communication system including:

a weighing controlling section to monitor a change in a power level of a sample of each of two or more delay profiles to be used in same power adding processing in delay profile calculation for path search processes and to assign weight to a power level of a specified sample according to a result from the monitoring.

In the foregoing, a preferable mode is one wherein the weighing controlling section saves a sample whose power level exceeds a power threshold value as a candidate for weighing control.

Also, a preferable mode is one wherein the weighing controlling section, when a number of samples of a candidate for the weighing control is 1 (one), assigns negative weight to a power level of the sample.

Also, a preferable mode is one wherein the weighing controlling section, when a number of samples of the candidate for the weighing control is two or more and when a difference in power levels among specified samples is a change threshold value or more, assigns negative weight to power levels of the two or more samples.

Also, a preferable mode is one wherein the weight assigned to the power level of the specified sample by the weighing controlling section is determined based on any one of a fixed value, a maximum power level, and an amount of a change in a power level.

Also, a preferable mode is one wherein, in comparison between the change threshold value and a difference in power levels among specified samples, when a number of samples of the candidate for the weighing control is 2 (two), a difference in power levels between the two samples is compared with the change threshold value and when a number of samples of the candidate for the weighing control is 3 (three) or more, a difference between a maximum power level and a minimum power level is compared with the change threshold value or a difference in power levels among samples of delay profiles existing before and after one another in terms of time is compared with the change threshold value.

According to a second aspect of the present invention, there is provided a path searching method employed in a CDMA communication system including:

a weighing controlling step of monitoring a change in a power level of a sample of each of two or more delay profiles to be used in same power adding processing in delay profile calculation for path search processes and of assigning weight to a power level of a specified sample according to a result from the monitoring.

In the foregoing, a preferable mode is one wherein, in the weighing controlling step, a sample whose power level exceeds a power threshold is saved as a candidate for weighing control.

Also, a preferable mode is one wherein, in the weighing controlling step, when a number of samples of a candidate for the weighing control is 1 (one), negative weight is assigned to a power level of the sample.

Also, a preferable mode is one wherein, in the weighing controlling step, when a number of samples of the candidate for the weighing control is two or more and when a difference in power levels among specified samples is a change threshold value or more, negative weight is assigned to power levels of the two or more samples.

Also, a preferable mode is one wherein the weight assigned to the power level of the specified sample in the weighing controlling step is determined based on any one of a fixed value, a maximum power level, and an amount of a change in a power level.

Also, a preferable mode is one wherein, in comparison between the change threshold value and a difference in power levels among specified samples, when a number of samples of the candidate for the weighing control is 2 (two), a difference in power levels between the two samples is compared with the change threshold value and when a number of samples of the candidate for the weighing control is 3 (three) or more, a difference between a maximum power level and a minimum power level is compared with the change threshold value or a difference in power levels among samples of delay profiles existing before and after one another in terms of time is compared with the change threshold value.

According to a third aspect of the present invention, there is provided a path searching program for having a computer execute a path searching method employed in a CDMA communication system including:

a weighing controlling step of monitoring a change in a power level of a sample of each of two or more delay profiles to be used in same power adding processing in delay profile calculation for path search processes and of assigning weight to a power level of a specified sample according to a result from the monitoring.

In the foregoing, a preferable mode is one wherein, in the weighing controlling step, a sample whose power level exceeds a power threshold is saved as a candidate for weighing control.

Also, a preferable mode is one wherein, in the weighing controlling step, when a number of samples of a candidate for the weighing control is 1 (one), negative weight is assigned to a power level of the sample.

Also, a preferable mode is one wherein, in the weighing controlling step, when a number of samples of the candidate for the weighing control is two or more and when a difference in power levels among specified samples is a change threshold value or more, negative weight is assigned to power levels of the two or more samples.

Also, a preferable mode is one wherein the weight assigned to the power level of the specified sample in the weighing controlling step is determined based on any one of a fixed value, a maximum power level, and an amount of a change in a power level.

Furthermore, a preferable mode is one wherein, in comparison between the change threshold value and a difference in power levels among specified samples, when a number of samples of the candidate for the weighing control is 2 (two), a difference in power levels between the two samples is compared with the change threshold value and when a number of samples of the candidate for the weighing control is 3 (three) or more, a difference between a maximum power level and a minimum power level is compared with the change threshold value or a power level difference among samples of delay profiles existing before and after one another in terms of time is compared with the change threshold value.

With the above configuration, in calculation of delay profiles in path searching process, a change in power levels of each sample of two or more delay profiles to be used in same power adding processing is monitored and weight is assigned to a specified sample according to a result from the monitoring and therefore it is possible to search a stable path.

That is, a first effect is that an error in detecting signal receiving path timing caused by noises can be reduced, thus enabling an excellent signal receiving characteristic to be obtained. A reason is that, by monitoring a power level of a delay profile and by exercising weighing control in delay profile power adding processes, it is possible to create an average delay profile in which an influence by an instantaneous high power level caused by noises is reduced. In other words, in the calculation of delay profiles, according to changes in levels of correlation values, by adaptively controlling delay profile averaging processing, a stable path is searched, thus achieving the excellent signal receiving characteristic.

A second effect is that a path change in mobile telecommunications can be quickly tracked and responded, enabling an excellent signal receiving characteristic to be achieved. A reason is that, by creating a delay profile with influences caused by noises being reduced, an average time of the delay profile is shortened and the path searching processing is speeded up.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments (example) with reference to the accompanying drawings.

Embodiment

Figure 1:
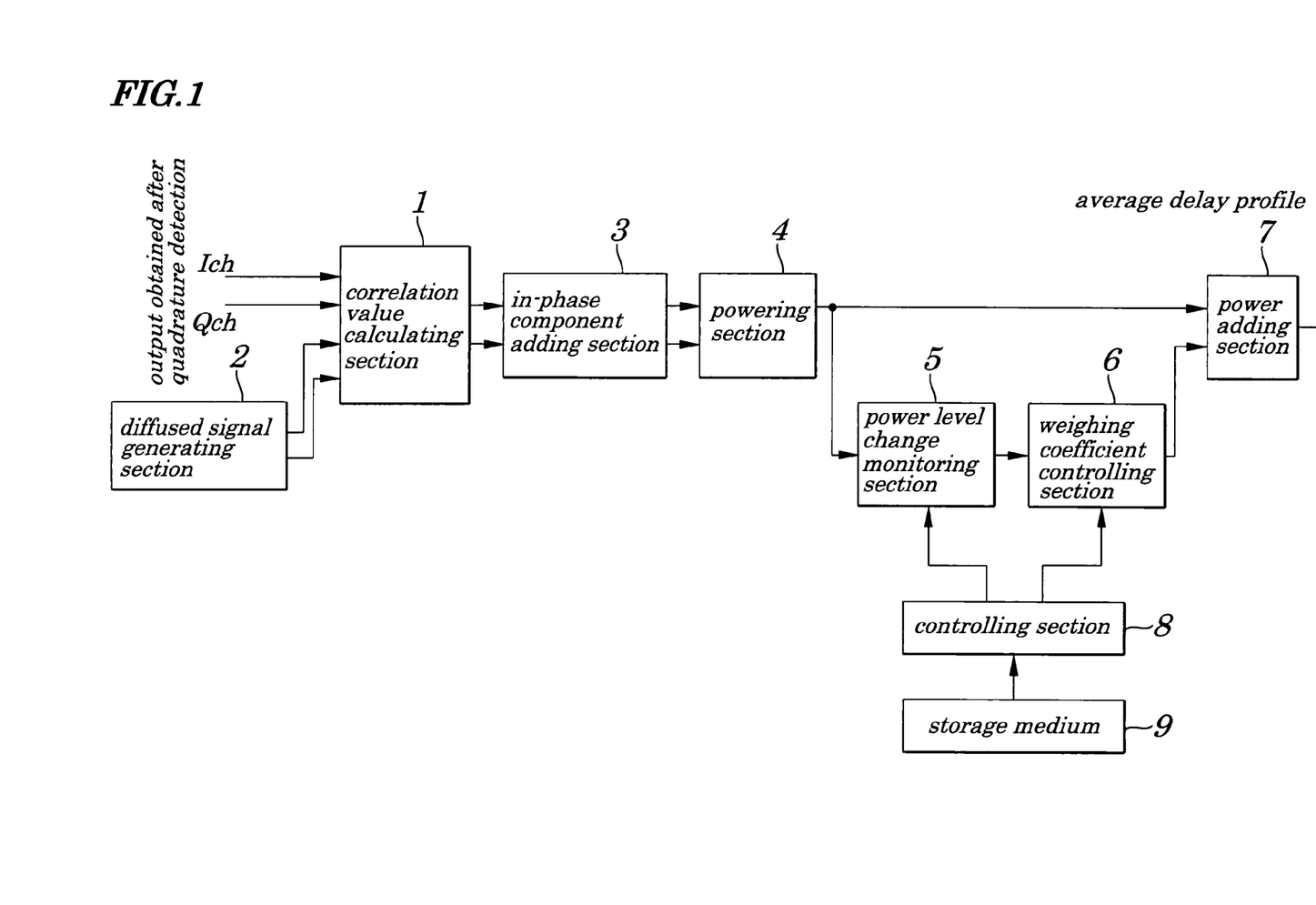
FIG. 1 is a block diagram showing a delay profile calculating circuit making up a path searching circuit according to an embodiment (a first example) of the present invention.

FIG. 1 is a diagram showing configurations of one example of a delay profile calculating circuit employed in a path searching circuit according to an embodiment of the present invention. The delay profile calculating circuit, as shown in FIG. 1, includes a correlation value calculating section 1, a diffused signal generating section 2, an in-phase component adding section 3, a powering section 4, a power level change monitoring section 5, a weighing coefficient controlling section 6, a power adding section 7, a controlling section 8, and a storage medium 9.

After each of an I component signal and Q component signal each having undergone quadrature detection and demodulation is input to the correlation value calculating section 1 and calculations are done to obtain a correlation value between the I component signal and Q component signal and a diffused signal generated by the diffused signal generating section 2. In order to improve an S/N (Signal to Noise) ratio, the in-phase component adding section 3 performs an adding calculation of in-phase components between the I component correlation value and the Q component correlation value. The powering section 4 powers the correlation value obtained by the adding calculation of in-phase components and calculates the delay profile. The power adding section 7 performs an averaging process on the obtained delay profile to smooth changes in power levels caused by noises and/or fading and calculates an average delay profile. A portable terminal estimates signal receiving path timing by using the average delay profile, that is, searches a path and performs a demodulating process.

In this embodiment of the present invention, the delay profile output from the powering section 4 is input to the power level change monitoring section 5 and a change in a power level of each sample of two or more delay profiles to be used for same power adding processing is monitored by the power level change monitoring section 5. In the weighing coefficient controlling section 6, by using the above result, when power is added by the power adding section 7, a weighing coefficient is controlled on a sample of the delay profile being estimated to be at a high power level caused by noises so that the power level becomes low.

When an outputting period (cycle) of the delay profile from the powering section 4 is so short that a change in received paths is negligible and if the delay profile is at a power level obtained with signal receiving path timing, the delay profiles being at a same power level are observed two or more times consecutively with same timing. On the other hand, the delay profiles that are not detected by the signal receiving path timing and that are affected by noises or a like are observed as not consecutively high power level signals and as severely changing level signals.

The power level change monitoring section 5 monitors a change in power levels of each of the delay profiles and inputs a result from the monitoring process to the weighing coefficient controlling section 6. In the weighing coefficient controlling section 6, in the case of sampling timing with which a result showing that the change in power levels of the delay profile is small occurs in the power averaging process in the power adding section 7, adding processing is performed with the sampling timing without weight being assigned to the power level, and, in the case of sampling timing with which a result showing that the change in power levels of the delay profile is large occurs, weight is assigned to the power level in the power adding processing and the weighing is controlled so that it is observed that the power level obtained after the averaging process is lower than that obtained by simply adding processing.

The controlling section 8 controls the power level change monitoring section 5 and the weighing coefficient controlling section 6. The storage medium 9 stores a path searching program to have a computer (controlling section 8) execute the patch searching method of this embodiment. The controlling section 8 exerts control on the power level change monitoring section 5 and the weighing coefficient controlling section 6 according to the path searching program stored in the storage medium 9. Contents of the path searching program are described later.

FIRST EXAMPLE

A first examples of the embodiment is explained by referring to FIG. 1. Configurations of a delay profile calculating circuit employed in the first example are the same as shown in FIG. 1. Each of an I component signal and a Q component signal having undergone quadrature detection and demodulation is input to the correlation value calculating section 1. The correlation value calculating section 1 calculates correlation values between a diffused signal generated by the diffused signal generating section 2 and the input I component signal and the Q component signal. Since there is a correlation between the diffused signal generated by the diffused signal generating section 2 and the received I and Q component signals in the CDMA communications, the calculation shows that there is a highly correlated value between the diffused signal and the I and Q component signals that are detected with signal receiving path timing. The resulting correlated values are input to the in-phase component adding section 3, where, in order to improve an S/N ratio of the delay profile, adding calculation of in-phase components in the correlation values of the I component and the Q component is performed. The correlation values obtained after the adding calculation of the in-phase components are input to the powering section 4, where powering calculation is performed on the input values and then are output as a delay profile.

In the power level change monitoring section 5, a power level obtained with each of sampling timing for two or more delay profiles to be used for processing of adding same power is monitored and a sample whose power level exceeds a power threshold "P_th" is saved as a candidate for weighing control and then a result from the monitoring is input to the weighing coefficient controlling section 6.

In the weighing coefficient controlling section 6, based on the input result, whether changes in the power levels detected with the same sampling timing are less than a change threshold value "Lev_th" is judged and a sample whose power level is less than a change threshold value "Lev_th" is judged to have a small change and is judged to be a sample detected with signal receiving path timing. Moreover, if the power level change detected with the same sampling timing is the change threshold value "Lev_th" or more, it is judged that the high power level is detected not with the signal receiving path timing but with sampling timing with which the power level is instantaneously high and changes greatly due to an influence by noises or a like and, when power adding processing is performed by the power adding section 7 using two or more delay profiles, a weighing coefficient W (<0) is determined so that an influence by the power level detected with sampling timing with which the power level is affected by noises or a like is reduced.

When the power adding section 7 performs power adding processing for two or more delay profiles to smooth power changes caused by noises and/or fading, since the power adding processing is performed by using a weighing coefficient determined by the weighing coefficient controlling section 6, calculation of the average delay profile is possible in which the influence by the instantaneous high power level caused by noises is reduced.

Various methods for determining a weighing coefficient W are available. A first method is to fix a value, in advance, as the weighing coefficient W.

A second method is to control the weighing coefficient W in accordance with a maximum power level of the delay profile. For example, if the maximum power level of the delay profile is X0 dB, the weighing coefficient W is set to be W0. If the maximum power level of the delay profile is X1 dB, the weighing coefficient W is set to be W1. Moreover, it is possible that the maximum power level is the maximum power level of the delay profile in the past.

A third method is to control a weighing coefficient W in accordance with an amount of a change in power levels. For example, if the amount of the change in power levels is Y0 dB, the weighing coefficient is W0 and if the amount of the change in power levels is Y1 dB, the weighing coefficient is W1.

Moreover, in a comparison method with the change threshold value "Lev_th", if samples at two points are detected with same sampling timing as samples of candidates for weighing control, a difference between power levels detected at the two points is compared with the change threshold value "Lev_th", and whether or not the weighing control is exercised is judged based on a result from the comparison. If samples at three points are detected with same sampling timing as samples of candidates for weighing control, following methods are available as the comparison method with the change threshold value "Lev_th":

A first method is to perform a comparison between a difference between a maximum power level and a minimum power level and the change threshold value "Lev_th".

A second method is to perform a comparison between a difference in power levels among samples of delay profiles detected before and after one another in terms of time and the change threshold value "Lev_th". When same sampling timing from delay profiles existing in, for example, the N-th order, (N+1)-th order, and (N+3)-th order is held as samples of candidates for weighing control, if a power level of the sample of each of the delay profiles is P_N, P_N1, and P_N3, respectively, calculations of |P_N−P_N1| and |P_N1−P_N3| are performed and resulting values from the calculation are compared with a change threshold value "Lev_th". If either or both of the resulting values are the change threshold value "Lev_th" or more, the weighing control is exercised.

Figure 2:
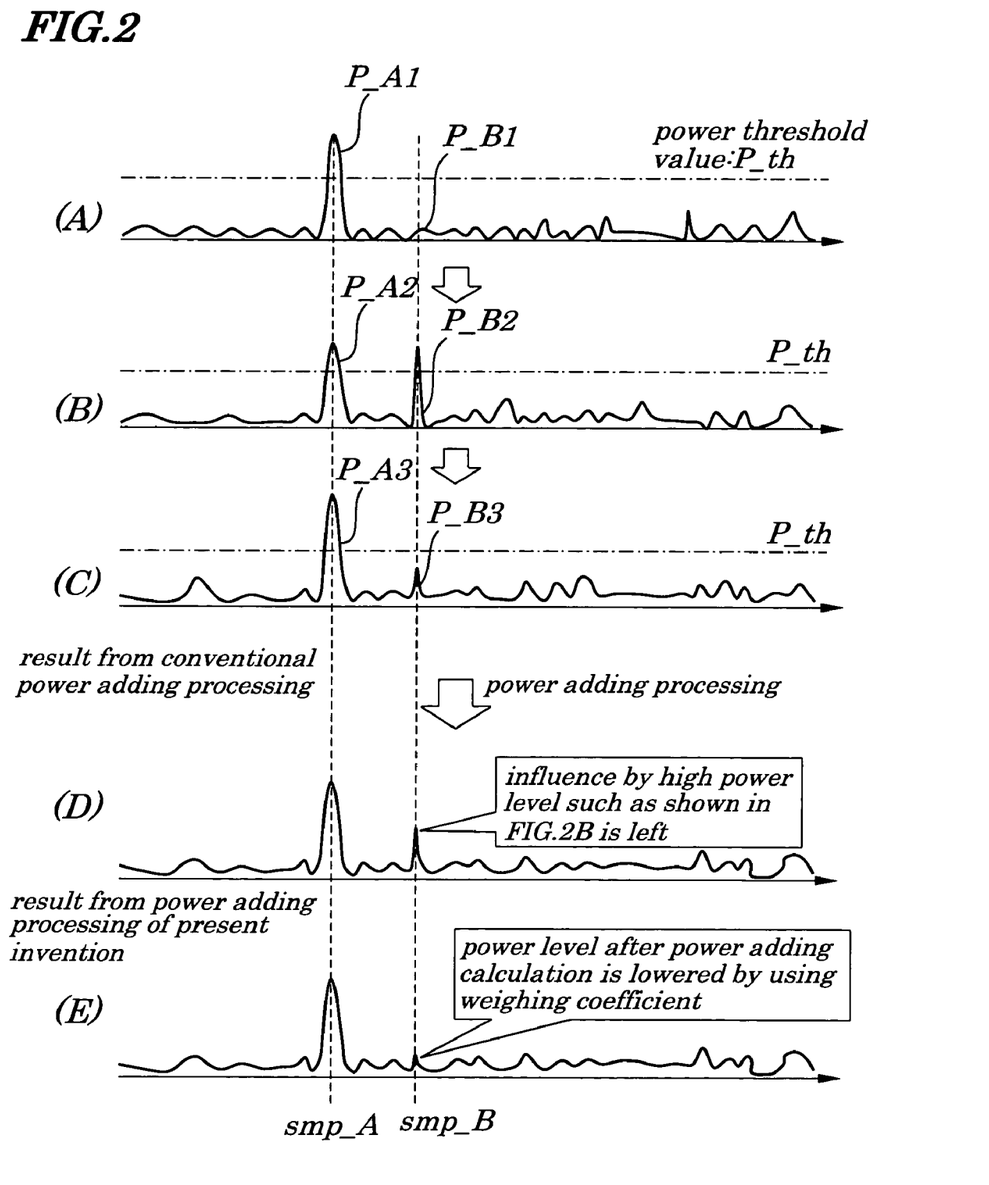
FIG. 2 is a diagram illustrating time-consecutive delay profiles output from a powering section making up the delay profile calculating circuit according to the embodiment (the first example)

Next, power level change monitoring processing to be performed by the power level change monitoring section 5 is described by referring to FIG. 1 and FIG. 2. FIG. 2 is a diagram illustrating time-consecutive delay profiles output from the powering section 4. Here, in the power adding section 7 shown in FIG. 1, let the number of power adding profiles be "3" as an example. At a sampling point (see a point Smp-A in waveforms (A) to (C) of FIG. 2) detected with signal receiving path timing, since held is a correlation between a diffused signal generated by the diffused signal generating section 2 and an output having underdone quadrature detection, high power levels are consecutively detected with same timing.

However, in mobile telecommunications, there are some cases where an erroneous high level power is detected which is caused by an influence by noises and/or fading in a propagation path (see a point Smp-B in waveforms (A) to (C) of FIG. 2). In this case, since there is no correlation between a noise and a diffused signal, there is few cases where a stable and high power level is consecutively detected.

In the power level change monitoring section 5, the power level of the input delay profile and its level change detected at a sampling point are monitored and a result from the monitoring is input to the weighing coefficient controlling section 6.

In the weighing coefficient controlling section 6, sampling timing with which a power level is greatly changed is judged to be incorrect sampling timing and a weighing coefficient is determined so that an influence on an average delay profile to be obtained after power adding processing is reduced.

In the ordinary power adding processing, a result of the average delay profile in which an influence by the power level change being considered to have instantaneously occurred due to noises shown as "P_B2" in waveform (B) of FIG. 2 detected with the sampling timing "Smp_B" shown in waveform (D) of FIG. 2 is left, is output by the power adding section 7. However, according to the embodiment of the present invention, it is possible to generate an average delay profile in which an influence by the power level change shown as "P_B2" in waveform (B) of FIG. 2 detected with the sampling timing "Smp_B" shown in waveform (E) of FIG. 2 is reduced.

That is, in the first example of this embodiment, a weighing coefficient (W<1) is determined by monitoring the power level change, and, in power adding processing, power adding calculation is done using a following expression with the sampling timing "Smp_B" shown in waveform (E) of FIG. 2 with which the power level change shown as "P_B2" in waveform (B) of FIG. 2 being judged to be influenced by noises is detected:

$$P\_B1 + W \times P\_B2 + P\_B3$$

In a delay profile not affected by noises, an error in detecting signal receiving path timing in a path searching process can be reduced, thus improving a signal receiving characteristic.

Figure 3:
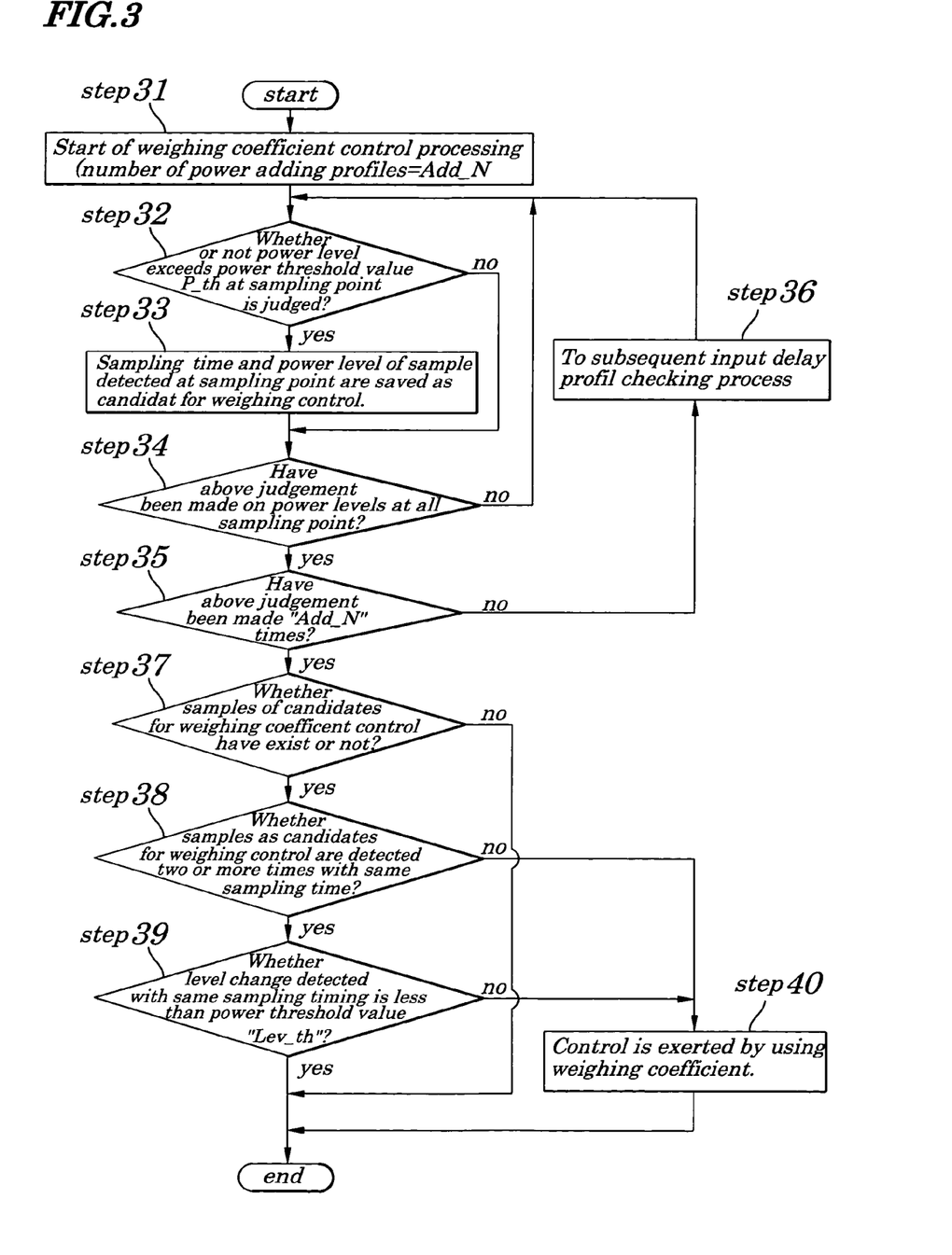
FIG. 3 is a flowchart showing procedures for weighing coefficient control processing according to the embodiment (the first example)

Next, weighing coefficient control processing is described by referring to FIG. 1 and FIG. 3. FIG. 3 is a flowchart showing procedures for the weighing coefficient control processing. Here, let the number of power adding profiles in the power adding section 7 be "Add_N" (N is a positive integer) (Step 31).

In the power level change monitoring section 5, whether a power level at a sampling point of the delay profile input from the powering section 4 exceeds a power threshold value "P_th" is judged (Step 32). At a sampling point whose power level exceeds the power threshold value, sampling timing and the detected power level are saved and held as a candidate for weighing control (Step 33). Moreover, if the power level does not exceed the power threshold value "P_th" at the sampling point, a routine proceeds to Step 34.

The above judgement is made on the power levels detected at all sampling points (Step 34). After the above judgement on the power levels detected at all sampling points has been completed, the same judgement is made on a subsequent delay profile (Step 35 and 36).

The same judgement processing is repeated "Add_N" times which are equivalent to the number of power adding profiles (Steps 32 to 36).

After the above judgement as to whether or not a power level exceeds the power threshold value "P_th" on all delay profiles to which power is to be added has been completed, information about candidates for weighing control is input from the power level change monitoring section 5 to the weighing coefficient controlling section 6. In the weighing coefficient controlling section 6, whether samples of candidates for weighing coefficient control exist or not is judged (Step 37) and a sample exists, whether the power level of the sample has been detected two or more times with the sampling timing is judged (Step 38). If the sample does not exist at Step 37, the routine terminates.

In Step 38, same sampling timing with which a power level is not detected two or more times, that is, with which a high power level exceeding the power threshold value "P_th" in delay profiles whose the number of power adding profiles is "Add_N" is detected only once is judged not as signal receiving path timing but as high power level sampling timing with which an instantaneous high power level caused by noises is detected and, therefore, control is exercised using a weighing coefficient W (<1) so that an influence by the power level detected with the high power level sampling timing is reduced at time of adding power (Step 40).

On the other hand, if samples detected as candidate for weighing control two or more times with same sampling timing exist in Step 38, it is judged whether or not amounts of the power level changes of the two or more samples are less than power threshold value "Lev_th" (Step 39).

If the amount of the power level change detected with sampling timing is less than the power threshold value "Lev_th" in Step 39, the sampling timing used for the detection is judged as signal receiving path timing with which a high power level showing little change is detected and no weighing coefficient control is exercised.

On the other hand, if the amount of the power level change detected with sampling timing is the power threshold value "Lev_th" or more in Step 39, the sampling timing used for the detection is judged as the sampling timing with which a high power level caused by noises is detected and weighing control is exercised using the weighing coefficient W (Step 40).

SECOND EXAMPLE

Next, a second example of this embodiment will be described in detail. In the path searching circuit according to this embodiment, an influence by noises is reduced by monitoring a level of a powered delay profile and controlling a weighing coefficient. In addition, even by performing a level monitoring process and a weighing coefficient controlling process after correlation value calculating process or in-phase component adding process, a delay profile with the influence by noises being reduced can be created.

Figure 4:
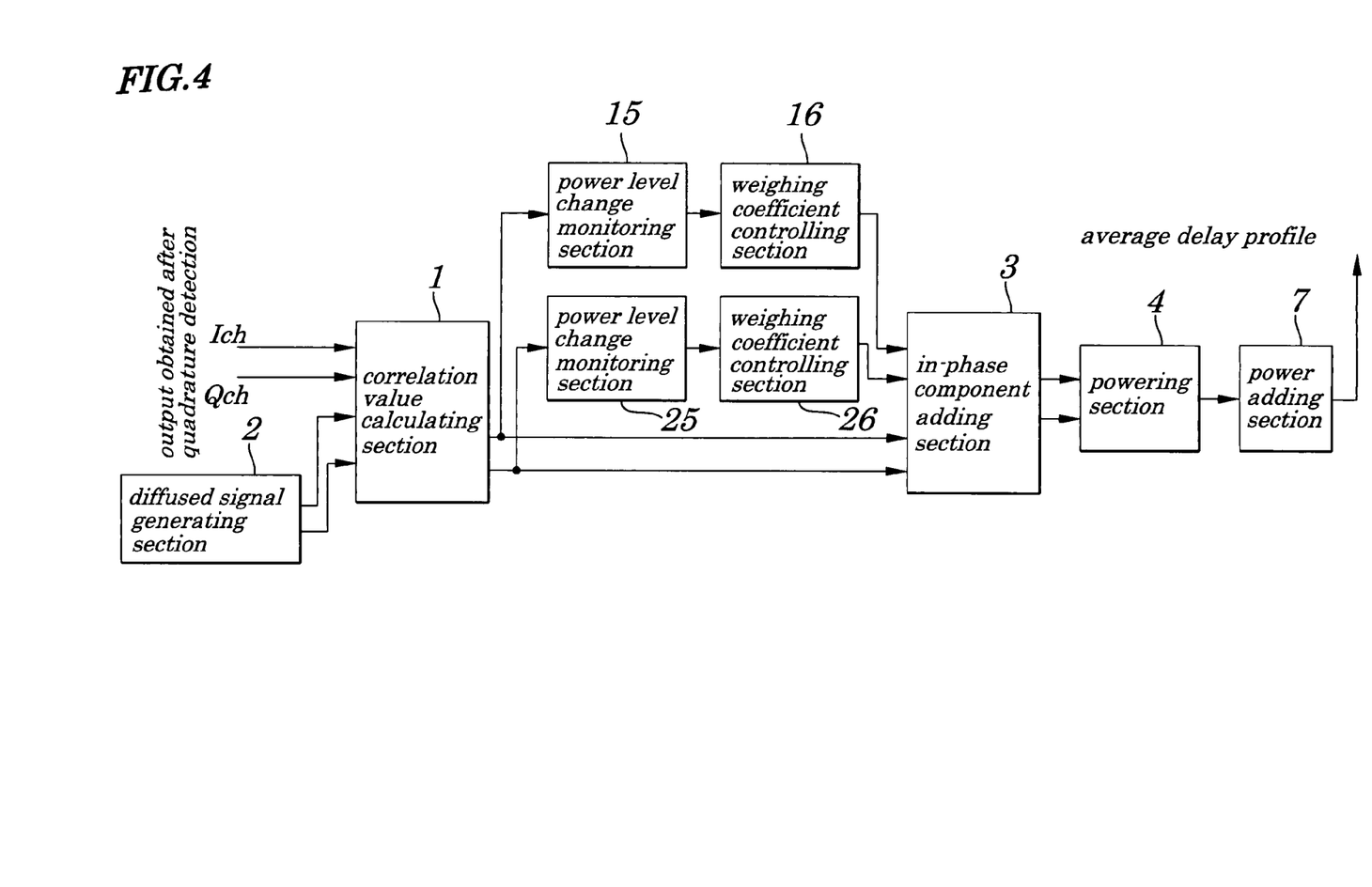
FIG. 4 is a block diagram showing a circuit to perform a level monitoring process and weighing coefficient control process after correlation value calculation according to the embodiment (a second example) of the present invention.

FIG. 4 is a diagram showing configurations of a circuit to perform the level monitoring process and weighing coefficient control process after correlation value calculation. As shown in FIG. 4, between a correlation value calculating section 1 and an in-phase component adding section 3, a power level change monitoring section 15, a weighing coefficient controlling section 16, a power level change monitoring section 25, and a weighing coefficient controlling section 26 are connected. Moreover, same reference numbers are assigned to components having same functions as those shown in FIG. 1 and their descriptions are omitted accordingly.

When monitoring an amount of a change in power levels before powering processing, a change in correlation value level of each of an I component correlation value and a Q component correlation value is checked. A weighing coefficient is determined from the result and weighing control is exercised at time of an in-phase component adding calculating process by the in-phase component adding section 3 to obtain a result from the in-phase component adding calculation in which an influence caused by noises is reduced. The weighing control may be exercised at time of the powering processing by a powering section 4.

Figure 5:
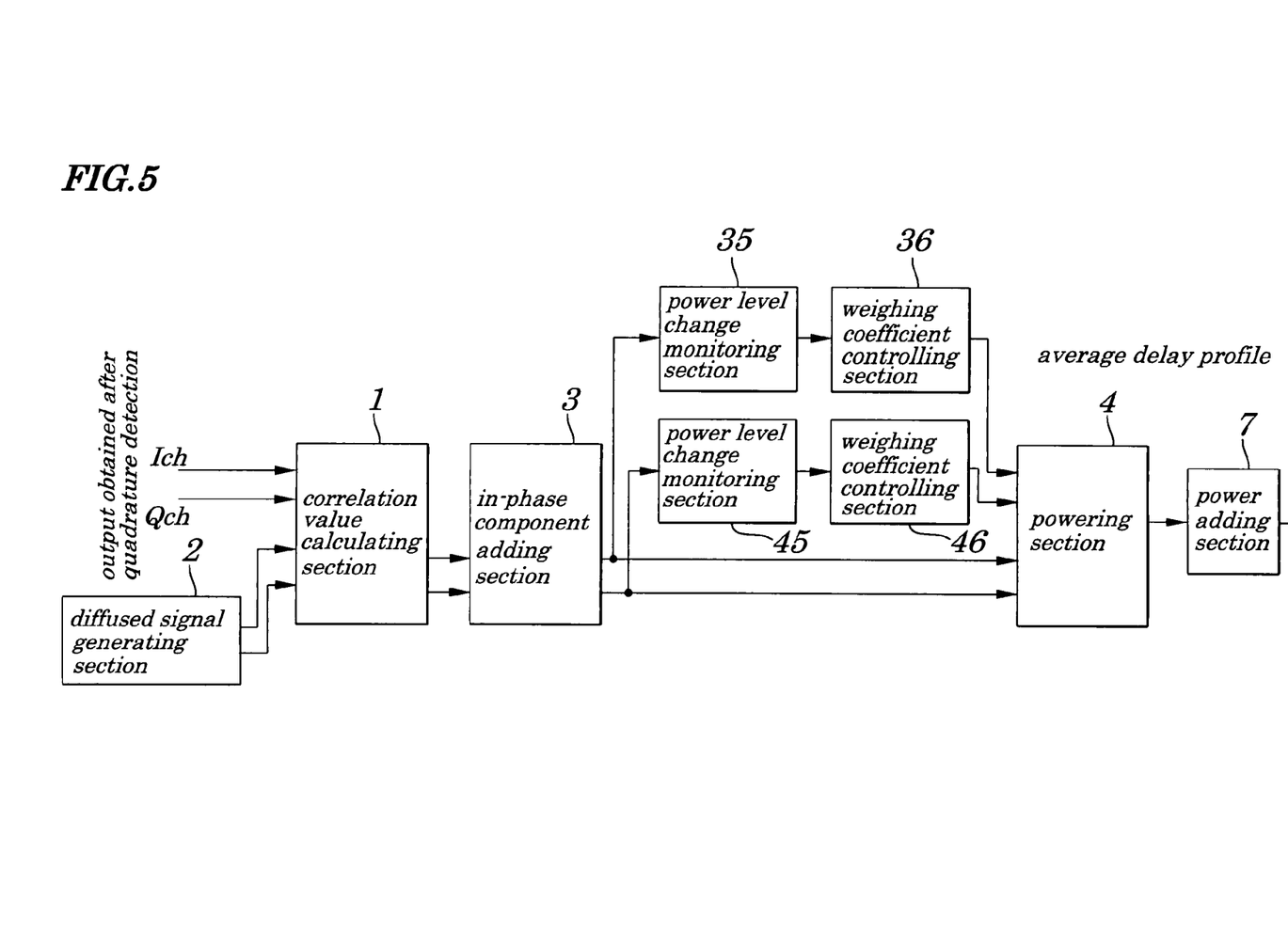
FIG. 5 is a block diagram showing a circuit to perform a level monitoring process and weighing coefficient control process after in-phase component adding processing according to the embodiment (the second example).

FIG. 5 is a diagram showing configurations of a circuit to perform the level monitoring process and weighing coefficient control process after the in-phase component adding processing. As shown in FIG. 5, between an in-phase correlation value calculating section 3 and a powering section 4, a power level change monitoring section 35, a weighing coefficient controlling section 36, a power level change monitoring section 45, and a weighing coefficient controlling section 46 are connected. Moreover, same reference numbers are assigned to components having same functions as those shown in FIG. 1 and their descriptions are omitted accordingly.

When monitoring an amount of a change in power levels before powering processing, a change in correlation value levels of each of the I component correlation value and the Q component correlation value is checked. A weighing coefficient is determined from the result and weighing control is exercised at time of a powering process by the powering section 4 to obtain a result from the in-phase component adding calculation in which an influence by noises is reduced.

Moreover, various methods for determining a threshold value to detect a high power level are available. A first method is to fix a value, in advance, as the threshold value. A second method is to determine the threshold value based on a fedback maximum power level by using average profiles in the past. For example, a value of a maximum power level+xdB ("x" maybe a negative value) or a like can be used. A third method is to determine the threshold value based on a maximum power level detected in same delay profiles. For example, a value of a maximum power level+xdB ("x" may be a negative value) or a like can be used.

THIRD EXAMPLE

Next, a third example of this embodiment will be described in detail. As a third example, a path searching program is provided which has a computer (controlling section 8) execute the path searching method described in the first and second examples. As described above, the path searching program is stored in the storage medium 9 shown in FIG. 1. Contents of the path searching program is shown in the flowchart shown in FIG. 3. The controlling section 8 controls the power level change monitoring sections 5, 15, 25, 35, and 45 and weighing coefficient controlling sections 6, 16, 26, 36, and 46 in accordance with the path searching program stored in the storage medium 9. Descriptions of contents of the path searching program are omitted accordingly.

It is apparent that the present invention is not limited to the above embodiments but may be changed and modified without departing from the scope and spirit of the invention.

What is claimed is:

1. A path searching circuit employed in a CDMA (Code Division Multiple Access) communication system comprising:

a weighting controlling section to monitor a change in a power level of a sample of each of two or more delay profiles to be used in same power adding processing in delay profile calculation for path search processes and to exercise a weighting control for assigning weight to a power level of a specified sample, according to a result from the monitoring;

wherein a judgment as to whether said weighting control is exercised on a specified sample depends upon a number of samples of a candidate for said weighting control, wherein said weighting controlling section, when the number of samples of said candidate for said weighting control is 1 (one), assigns negative weight to a power level of the sample, the negative weight being a weighting value less than 0 (zero).

2. The path searching circuit according to claim 1, wherein said weighting controlling section saves a sample whose power level exceeds a power threshold value as said candidate for said weighting control.

3. The path searching circuit according to claim 1, wherein said weight assigned to said power level of said specified sample by said weighting controlling section is determined based on any one of a fixed value, a maximum power level, and an amount of a change in a power level.

4. The path searching circuit according to claim 3, wherein, in comparison between said change threshold value and a difference in power levels among specified samples, when the number of samples of said candidate for said weighting control is 2 (two), a difference in power levels between the two samples is compared with said change threshold value and when the number of samples of said candidate for said weighting control is 3 (three) or more, a difference between a maximum power level and a minimum power level is compared with said change threshold value or a difference in power levels among samples of delay profiles existing before and after one another in terms of time is compared with said change threshold value.

5. A path searching circuit employed in a CDMA (Code Division Multiple Access) communication system comprising:
- a weighting controlling section to monitor a change in a power level of a sample of each of two or more delay profiles to be used in same power adding processing in delay profile calculation for path search processes and to exercise a weighting control for assigning weight to a power level of a specified sample, according to a result from the monitoring;
- wherein a judgment as to whether said weighting control is exercised on a specified sample depends upon a number of samples of a candidate for said weighting control,
- wherein said weighting controlling section, when the number of samples of said candidate for said weighting control is two or more and when a difference in power levels among specified samples is a change threshold value or more, assigns negative weight to power levels of the two or more samples, the negative weight being a weighting value less than 0 (zero).

6. A path searching circuit employed in a CDMA (Code Division Multiple Access) communication system comprising:
- a weighting controlling means to monitor a change in a power level of a sample of each of two or more delay profiles to be used in same power adding processing in delay profile calculation for path search processes and to exercise a weighting control for assigning weight to a power level of a specified sample, according to a result from the monitoring;
- wherein a judgment as to whether said weighting control is exercised on a specified sample depends upon a number of samples of a candidate for said weighting control,
- wherein said weighting controlling means saves a sample whose power level exceeds a power threshold value as said candidate for said weighting control, and
- wherein said weighting controlling means, when the number of samples of said candidate for said weighting control is 1 (one), assigns negative weight to a power level of the sample, the negative weight being a weighting value less than 0 (zero).

7. The path searching circuit according to claim 6, wherein said weight assigned to said power level of said specified sample by said weighting controlling means is determined based on any one of a fixed value, a maximum power level, and an amount of a change in a power level.

8. A path searching circuit employed in a CDMA (Code Division Multiple Access) communication system comprising:
- a weighting controlling means to monitor a change in a power level of a sample of each of two or more delay profiles to be used in same power adding processing in delay profile calculation for path search processes and to exercise a weighting control for assigning weight to a power level of a specified sample, according to a result from the monitoring;
- wherein a judgment as to whether said weighting control is exercised on a specified sample depends upon a number of samples of a candidate for said weighting control,
- wherein said weighting controlling means saves a sample whose power level exceeds a power threshold value as said candidate for said weighting control, and
- wherein said weighting controlling means, when the number of samples of said candidate for said weighting control is two or more and when a difference in power levels among specified samples is a change threshold value or more, assigns negative weight to power levels of the two or more samples, the negative weight being a weighting value less than 0 (zero).

9. The path searching circuit according to claim 8, wherein, in comparison between said change threshold value and a difference in power levels among specified samples, when the number of samples of said candidate for said weighting control is 2 (two), a difference in power levels between the two samples is compared with said change threshold value and when the number of samples of said candidate for said weighting control is 3 (three) or more, a difference between a maximum power level and a minimum power level is compared with said change threshold value or a difference in power levels among samples of delay profiles existing before and after one another in terms of time is compared with said change threshold value.

10. A path searching method employed in a CDMA (Code Division Multiple Access) communication system comprising:
- a weighting controlling step of monitoring a change in a power level of a sample of each of two or more delay profiles to be used in same power adding processing in delay profile calculation for path search processes and of exercising a weighting control for assigning weight to a power level of a specified sample according to a result from the monitoring;
- wherein a judgment as to whether said weighting control is exercised on a specified sample depends upon a number of samples of a candidate for said weighting control,
- wherein, in said weighting controlling step, a sample whose power level exceeds a power threshold is saved as said candidate for said weighting control, and
- wherein, in said weighting controlling step, when the number of samples of said candidate for said weighting control is 1 (one), negative weight is assigned to a power level of the sample, the negative weight being a weighting value less than 0 (zero).

11. The path searching method according to claim 10, wherein said weight assigned to said power level of said specified sample in said weighting controlling step is determined based on any one of a fixed value, a maximum power level, and an amount of a change in a power level.

12. A path searching method employed in a CDMA (Code Division Multiple Access) communication system comprising:
- a weighting controlling step of monitoring a change in a power level of a sample of each of two or more delay profiles to be used in same power adding processing in delay profile calculation for path search processes and of exercising a weighting control for assigning weight to a power level of a specified sample according to a result from the monitoring;
- wherein a judgment as to whether said weighting control is exercised on a specified sample depends upon a number of samples of a candidate for said weighting control,
- wherein, in said weighting controlling step, a sample whose power level exceeds a power threshold is saved as said candidate for said weighting control, and
- wherein, in said weighting controlling step, when the number of samples of said candidate for said weighting control is two or more and when a difference in power levels among specified samples is a change threshold value or more, negative weight is assigned to power levels of the two or more samples, the negative weight being a weighting value less than 0 (zero).

13. The path searching method according to claim 12, wherein, in comparison between said change threshold value and a difference in power levels among specified samples, when the number of samples of said candidate for said weighting control is 2 (two), a difference in power levels between the two samples is compared with said change threshold value and when the number of samples of said candidate for said weighting control is 3 (three) or more, a difference between a maximum power level and a minimum power level is compared with said change threshold value or a difference in power levels among samples of delay profiles existing before and after one another in terms of time is compared with said change threshold value.

14. A computer readable medium storing a path searching program for having a computer execute a path searching method employed in a CDMA (Code Division Multiple Access) communication system comprising:
- a weighting controlling step of monitoring a change in a power level of a sample of each of two or more delay profiles to be used in same power adding processing in delay profile calculation for path search processes and of exercising a weighting control for assigning weight to a power level of a specified sample according to a result from the monitoring;
- wherein a judgment as to whether said weighting control is exercised on a specified sample depends upon a number of samples of a candidate for said weighting control,
- wherein, in said weighting controlling step, a sample in which its power level exceeds a power threshold is saved as said candidate for said weighting control, and
- wherein, in said weighting controlling step, when the number of samples of said candidate for said weighting control is 1 (one), negative weight is assigned to a power level of the sample, the negative weight being a weighting value less than 0 (zero).

15. The path searching program according to claim 14, wherein said weight assigned to said power level of said specified sample in said weighting controlling step is determined based on any one of a fixed value, a maximum power level, and an amount of a change in a power level.

16. A computer readable medium storing a path searching program for having a computer execute a path searching method employed in a CDMA (Code Division Multiple Access) communication system comprising:
- a weighting controlling step of monitoring a change in a power level of a sample of each of two or more delay profiles to be used in same power adding processing in delay profile calculation for path search processes and of exercising a weighting control for assigning weight to a power level of a specified sample according to a result from the monitoring;
- wherein a judgment as to whether said weighting control is exercised on a specified sample depends upon a number of samples of a candidate for said weighting control,
- wherein, in said weighting controlling step, a sample in which its power level exceeds a power threshold is saved as said candidate for said weighting control, and
- wherein, in said weighting controlling step, when the number of samples of said candidate for said weighting control is two or more and when a difference in power levels among specified samples is a change threshold value or more, negative weight is assigned to power levels of the two or more samples, the negative weight being a weighting value less than 0 (zero).

17. The path searching program according to claim 16, wherein, in comparison between said change threshold value and a difference in power levels among specified samples, when the number of samples of said candidate for said weighting control is 2 (two), a difference in power levels between the two samples is compared with said change threshold value and when the number of samples of said candidate for said weighting control is 3 (three) or more, a difference between a maximum power level and a minimum power level is compared with said change threshold value or a power level difference among samples of delay profiles existing before and after one another in terms of time is compared with said change threshold value.

* * * * *